United States Patent
Langness et al.

(10) Patent No.: US 12,366,306 B2
(45) Date of Patent: Jul. 22, 2025

(54) EVALUATION SYSTEM AND METHOD

(71) Applicant: Transportation IP Holdings, LLC, Norwalk, CT (US)

(72) Inventors: Chenaniah Langness, Erie, PA (US); Benedict George Lander, Erie, PA (US); Stephen Kocienski, Fort Worth, TX (US)

(73) Assignee: Transportation IP Holdings, LLC, Norwalk, CT (US)

( * ) Notice: Subject to any disclaimer, the term of this patent is extended or adjusted under 35 U.S.C. 154(b) by 476 days.

(21) Appl. No.: 17/401,268

(22) Filed: Aug. 12, 2021

(65) Prior Publication Data

US 2023/0046464 A1    Feb. 16, 2023

(51) Int. Cl.
*F16K 37/00* (2006.01)

(52) U.S. Cl.
CPC ................ *F16K 37/0083* (2013.01)

(58) Field of Classification Search
CPC .................................................. F16K 37/0083
See application file for complete search history.

(56) References Cited

U.S. PATENT DOCUMENTS

| | | |
|---|---|---|
| 4,662,604 A | 5/1987 | Cook |
| 5,329,465 A * | 7/1994 | Arcella ............... F16K 37/0083 706/915 |
| 5,433,245 A | 7/1995 | Prather et al. |
| 6,178,956 B1 | 1/2001 | Steinmann et al. |
| 6,267,349 B1 * | 7/2001 | Gomes ................. F16K 31/408 251/38 |
| 6,411,081 B1 | 6/2002 | Spellman |
| 6,601,821 B2 | 8/2003 | Tyler |
| 8,672,291 B2 | 3/2014 | Tyler |
| 8,904,784 B2 | 12/2014 | Pesiridis et al. |

(Continued)

FOREIGN PATENT DOCUMENTS

| | | |
|---|---|---|
| CA | 3080229 A1 | 5/2019 |
| DE | 102008058208 A1 | 5/2010 |

(Continued)

OTHER PUBLICATIONS

Extended European Search Report for corresponding EP Application No. 22185596.8-1015 dated Dec. 21, 2022 (10 pages).

(Continued)

*Primary Examiner* — Hyun D Park
(74) *Attorney, Agent, or Firm* — K&L Gates LLP

(57) ABSTRACT

A system and method include measuring input electric current that is input into an electrically controlled valve to change a position of the valve. Output electric current that is output from the valve in response to the input electric current being input into the electrically controlled valve is measured. Position signals are generated using a sensor coupled with the electrically controlled valve that are indicative of the position of the valve. Baseline values associated with the input electric current, the output electric current, and the position signals are calculated. A health state of the valve is determined by comparing the baseline values associated with the input electric current, the output electric current, and the position signals with subsequently measured values associated with the input electric current, the output electric current, and the position signals.

13 Claims, 7 Drawing Sheets

(56) References Cited

U.S. PATENT DOCUMENTS

| | | |
|---|---|---|
| 9,068,535 B2 | 6/2015 | Graichen et al. |
| 9,541,040 B2 | 1/2017 | Karunaratne et al. |
| 9,897,114 B2 | 2/2018 | Baasch et al. |
| 2002/0095986 A1 | 7/2002 | Ito et al. |
| 2004/0172228 A1* | 9/2004 | Aragones ............... G05B 17/02 703/8 |
| 2007/0095400 A1* | 5/2007 | Bergquist .................. F16K 7/14 137/485 |
| 2008/0163936 A1* | 7/2008 | Boger ................ F16K 37/0075 137/455 |
| 2011/0255992 A1* | 10/2011 | Tran ...................... F04B 49/065 417/1 |
| 2016/0146374 A1 | 5/2016 | Graichen et al. |
| 2019/0063269 A1* | 2/2019 | Sittner ................ F02D 13/0226 |
| 2019/0262646 A1* | 8/2019 | Linsmeier ........... F04D 15/0209 |

FOREIGN PATENT DOCUMENTS

| | | |
|---|---|---|
| EP | 0315391 B1 | 4/1994 |
| EP | 3683478 A1 | 7/2020 |
| JP | H01153881 A | 6/1989 |
| JP | 2006009855 A | 1/2006 |
| JP | 2010039715 A | 2/2010 |
| JP | 2019143645 A | 8/2019 |

OTHER PUBLICATIONS

Examination Report No. 1 for corresponding AU Application No. 2022205194 dated Aug. 31, 2023 (4 pages).
Office Action for corresponding JP Application No. 2022107999 dated Oct. 30, 2023 (10 pages).

* cited by examiner

| Case | A T/F | B T/F2 | C T/F3 | D T/F4 | E T/F5 | F T/F6 | Binary | Classification |
|---|---|---|---|---|---|---|---|---|
| 1 | 0 | 0 | 0 | 0 | 0 | 0 | 000000 | Healthy |
| 2 | 0 | 0 | 0 | 0 | 0 | 1 | 000001 | Inconclusive |
| 3 | 0 | 0 | 0 | 0 | 1 | 0 | 000010 | Inconclusive |
| 4 | 0 | 0 | 0 | 0 | 1 | 1 | 000011 | Position Sensor |
| 5 | 0 | 0 | 0 | 1 | 0 | 0 | 000100 | Inconclusive |
| 6 | 0 | 0 | 0 | 1 | 0 | 1 | 000101 | Inconclusive |
| 7 | 0 | 0 | 0 | 1 | 1 | 0 | 000110 | Solenoid Issue |
| 8 | 0 | 0 | 0 | 1 | 1 | 1 | 000111 | Solenoid Issue |

EVALUATION SYSTEM AND METHOD

BACKGROUND

Technical Field

The subject matter described herein relates to an evaluation system and related method.

Discussion of Art

Stationary and non-stationary mechanical systems that use diesel or gasoline as a fuel source create exhaust that is expelled out into the atmosphere. These systems may include valves and conduits that may be controlled to control an amount of emissions that are exhausted from the system. For example, an exhaust gas recirculation valve may be an electrically controlled valve used within the system to recirculate a portion of exhaust gases generated by engine of the system. Over time, these recirculation valves may occasionally require maintenance, repair, or replacing. However, determining a level of health of the valve, or a particular component within the valves that require maintenance or repair, is difficult to properly distinguish. For example, plural different failure modes of the EGR valves may be lumped together and classified as generally unhealthy, rather than accurately identifying a higher level of failure mode, thereby resulting in extra troubleshooting and unnecessary material replacement.

BRIEF DESCRIPTION

In one or more embodiments, a method includes measuring input electric current that is input into an electrically controlled valve to change a position of the electrically controlled valve. Output electric current that is output from the electrically controlled valve in response to the input electric current being input into the electrically controlled valve is measured. Position signals are generated using a sensor coupled with the electrically controlled valve that are indicative of the position of the electrically controlled valve. Baseline values associated with the input electric current, the output electric current, and the position signals are calculated. A health state of the electrically controlled valve is determined by comparing the baseline values associated with the input electric current, the output electric current, and the position signals with subsequently measured values associated with the input electric current, the output electric current, and the position signals.

In one or more embodiments, a system includes an electrically controlled valve that receives input electric current to change a position of the electrically controlled valve, one or more sensors configured to measure the input electric current that is input into the electrically controlled valve and measure output electric current that is output from the electrically controlled valve in response to the input electric current being input into the electrically controlled valve. The sensors generate position signals indicative of the position of the electrically controlled valve. The system includes one or more processors that calculate baseline values associated with the input electric current, the output electric current, and the position signals. The processors determine a health state of the electrically controlled valve by comparing the baseline values associated with the input electric current, the output electric current, and the position signals with subsequently measured values associated with the input electric current, the output electric current, and the position signals.

In one or more embodiments, a method includes measuring input electric current that is input into an electrically controlled valve to change a position of the electrically controlled valve. The method includes measuring output electric current that is output from the electrically controlled valve in response to the input electric current being input into the electrically controlled valve. Position voltages are measured using a sensor coupled with the electrically controlled valve. The position voltages are indicative of the position of the electrically controlled valve. Baseline values associated with the input electric current, the output electric current, and the position voltages are calculated based on previous measurements of the input electric current, the output electric current, and the position voltages. The baseline values that are calculated include a first mean and a first standard deviation of sums of the position voltages repeatedly sampled during a prior moving time window, a second mean and a second standard deviation of first differences between the position voltages repeatedly sampled during the prior moving time window, and a third mean and a third standard deviation of second differences between the input electric current and the output electric current repeatedly sampled during the prior moving time window. A fourth mean and a fourth standard deviation of the sums of the position voltages repeatedly sampled during a subset of the prior moving time window are calculated, a fifth mean and a fifth standard deviation of the first differences between the position voltages repeatedly sampled during the subset of the prior moving time window are calculated, and a sixth mean and a sixth standard deviation of the second differences between the input electric current and the output electric current repeatedly sampled during the subset of the prior moving time window are calculated. The fourth mean and the fourth standard deviation are compared with the first mean and the first standard deviation, the fifth mean and the fifth standard deviation are compared with the second mean and the second standard deviation, and the sixth mean and the sixth standard deviation are compared with the third mean and the third standard deviation. A health state of the electrically controlled valve is determined by determining a set of comparison values indicative of comparing the fourth mean and the fourth standard deviation with the first mean and the first standard deviation, the fifth mean and the fifth standard deviation with the second mean and the second standard deviation, and the sixth mean and the sixth standard deviation with the third mean and the third standard deviation. The set of the comparison values are mapped with different values of the health state of the electrically controlled value to determine the health state of the electrically controlled valve.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to evaluation systems and methods related thereto. The evaluation systems may be used to determine a state of health of an electrically controlled valve, such as an exhaust gas recirculation (EGR) valve that is used within a system that expels an exhaust gas or other fluid. For example, the EGR valve may be controlled to recirculate a portion of exhaust gas generated by an engine back to the engine cylinders, and the evaluation system and method described herein may determine the state of health of the EGR valve.

The state of health of the electrically controlled valve may be determined by measuring different data associated with the valve. For example, the data set may include an input electric current that is applied to a pump device that pumps a fluid into a chamber of the valve, an output electric current that is output in response to the input electric current being input, and position signals using a position sensor indicative of a position of the electrically controlled valve. As one example, the position signals may be or comprise position voltages. Baseline values associated with the input electric current, the output electric current, and the position signals based on previous measurements may be calculated, and the state of health of the valve may be determined by comparing the baseline values associated with the input electric current, the output electric current, and the position voltages with recent (e.g., subsequently measured) values associated with the input electric current, the output electric current, and the position signals.

In one or more embodiments, the baseline values that are calculated may include a sum of the position signals (e.g., position voltages). Optionally, the baseline values may include a difference between the position signals. Optionally, the baseline values may include a difference between the input electric current and the output electric current. In one or more embodiments, the baseline values may include a mean and standard deviation of the sums of the position signals repeatedly sampled during a prior moving time window; may include a mean and standard deviation of the differences between the position signals repeatedly sampled during the prior moving time window; and may include a mean and standard deviation of the differences between the input electric current and the output electric current. Optionally, the baseline values may be determined or calculated by alternative evaluation methods. For example, the baseline values may be based on an average of the data set, a percentage of the data set, whether the data set is within or outside of a predetermined acceptable range, or the like.

Figure 1:
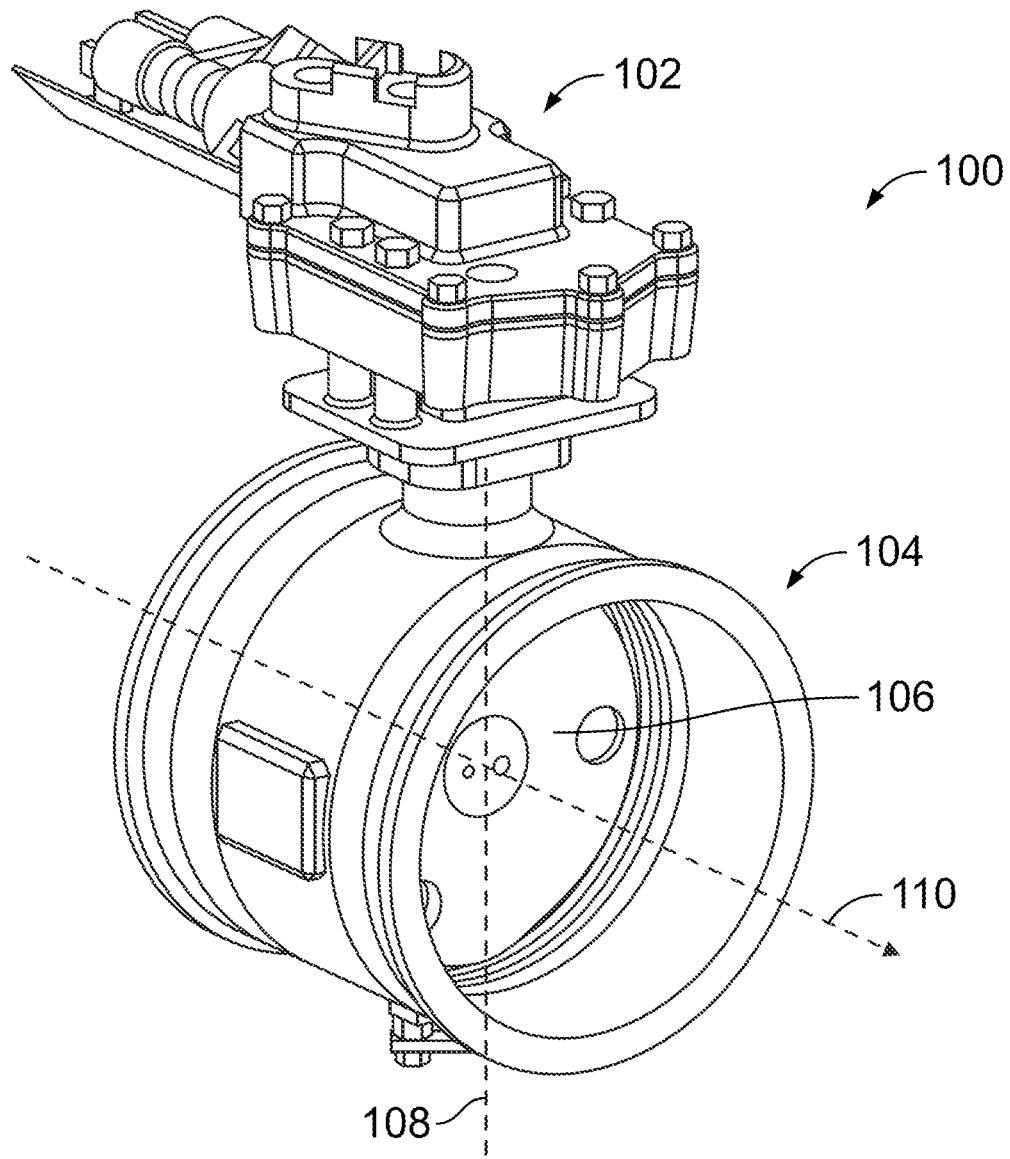
FIG. 1 illustrates an electrically controlled valve in accordance with one embodiment.

FIG. 1 illustrates an electrically controlled valve 100 in accordance with one embodiment. In one or more embodiments, the electrically controlled valve may be an exhaust gas recirculation (EGR) valve that is used within a system that expels a gas or other fluid. For example, the EGR valve may be used within a fuel powered vehicle (e.g., a rail vehicle, automobile, a truck, a bus, a mining vehicle, a marine vessel, a manned and/or unmanned aircraft, an agricultural vehicle, or another off-highway vehicle) or an alternative fuel powered system (e.g., manufacturing machinery, power generating systems, domestic machinery, or the like. In one or more embodiments, the EGR system may use a liquid fuel such as diesel or gasoline. The EGR valve may be used to control an amount of emissions generated by the vehicle and/or non-vehicle systems. For example, the EGR valve may be controlled to recirculate a portion of exhaust gas generated by an engine back to the engine cylinders.

The electrically controlled valve includes an electrical portion 102 and a mechanical portion 104 operably coupled with the electrical portion. The mechanical portion includes a plate 106 that is configured to rotate about an axis 108 based on control of the plate by the electrical portion of the valve. For example, the electrical portion may control a position of the plate between a closed position and one or more different open positions. Recirculated exhaust gas may be directed through the mechanical portion of the valve in a direction 110. The position of the plate may control an amount of exhaust gas that is directed through the valve. For example, the plate may be in a closed position such that the plate prohibits gas from being directed through the valve in the direction 110. Optionally, the plate may be in one or more different open positions to control an amount of the gas that is directed through the valve.

Figure 2:
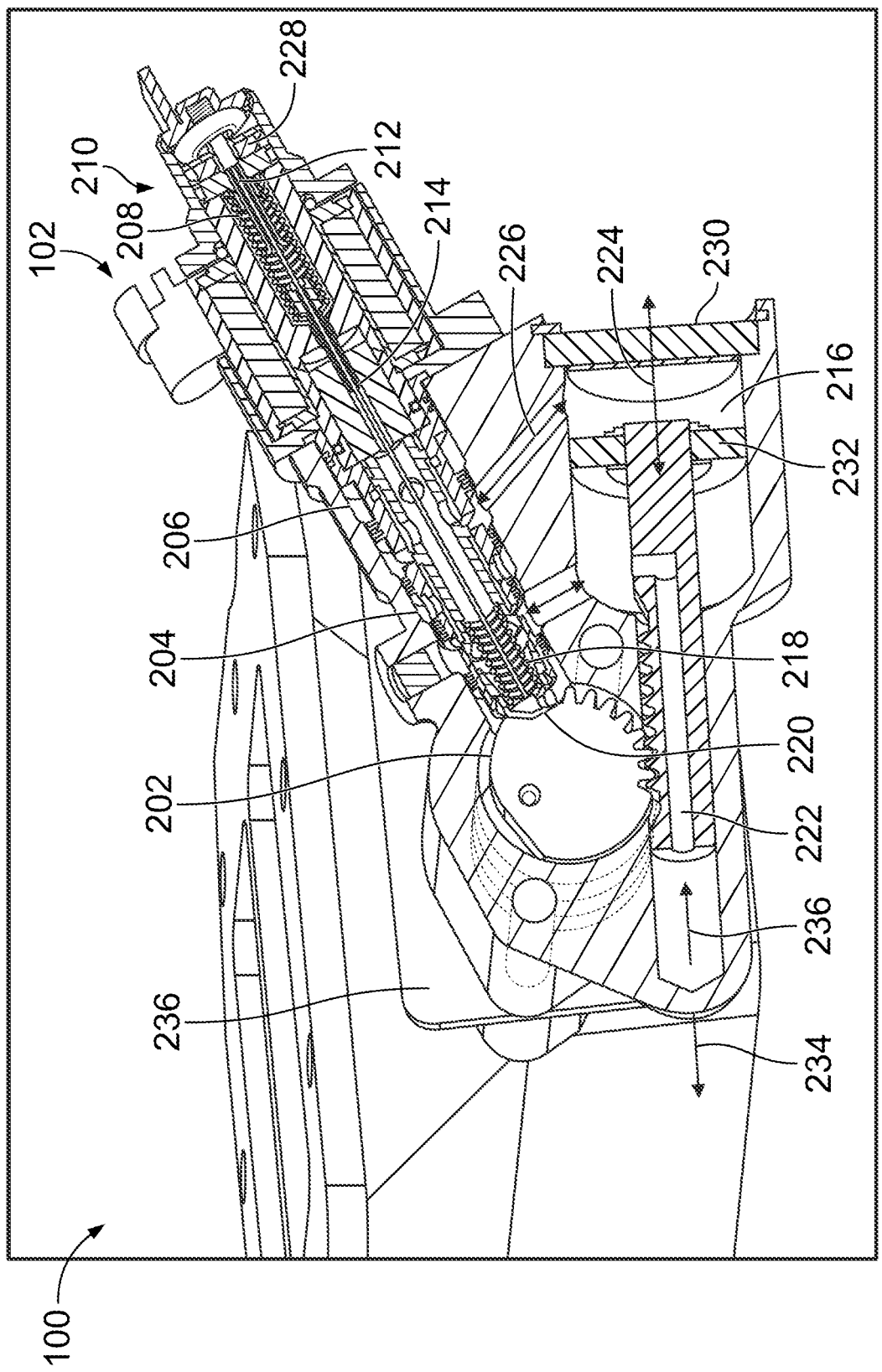
FIG. 2 illustrates a partial cross-sectional view of the electrically controlled valve shown in FIG. 1.

FIG. 2 illustrates a partial cross-sectional view of the electrical portion of the electrically controlled valve shown in FIG. 1. The valve includes a chamber 216 that is defined by a chamber end surface 230 and a rack end surface 232, and plural interior surfaces of the chamber. The rack end surface is operably coupled with a rack 222. A pump (not shown) directs a fluid into the valve via a fluid inlet 204 and out of the valve via a fluid outlet 206. In one or more embodiments, the pump may be electrically controlled, such that an electric current is directed to the pump to control operation of the pump. The fluid may be a gas, a liquid, or a gas-liquid mixture. In one embodiment, the fluid may be oil. Optionally, the fluid may be an alternative liquid and/or gas. The fluid is directed into the chamber via a passage 226. The rack is configured to move in a linear direction based on an amount of the fluid within the chamber. As the fluid within the chamber increases, the rack moves in a first direction 234 and away from the chamber end surface. Alternatively, as the fluid within the chamber decreases, the rack moves in an opposite second direction 236 and toward the chamber end surface.

The rack is operably coupled with a gear 202 such that the gear rotates responsive to the linear movement of the rack in the first or second directions. For example, as the amount of fluid in the chamber increases, the rack moves in the first direction, and the gear rotates in a first direction about a center axis. The gear rotates in an opposite second direction responsive to the amount of fluid in the chamber decreasing and the rack moving in the second direction. The gear is operably coupled with the plate (shown in FIG. 1) such that rotation of the gear causes rotation of the plate between a closed position and one or more different open positions. For example, rotational movement of the gear translates to rotational movement of the plate to control a position of the plate between a closed position and one or more open positions. Optionally, the plate may be operably coupled with another device that controls movement of the plate with linear movement instead of rotational movement. Optionally, the position of the plate may be controlled by movement of any alternative device, component, feature, or the like.

The electrically controlled valve also includes a displacement sensor 210 disposed within the electrical portion of the valve. The displacement sensor may be referred to as a linear variable displacement transducer (LVDT) sensor, or the like. Optionally, the valve may include an alternative position and/or displacement sensor. In the illustrated embodiment, the displacement sensor includes a sensor rod 214, a spring 208, a solenoid 212, and a sensor coil 228. The displacement sensor is operably coupled with the gear via a spring 218. Rotation of the gear responsive to movement of the rack causes the spring to move in a linear direction. For example, the solenoid of the displacement sensor is indirectly coupled with the rack via the gear. Movement of the rack causes movement of the gear that is generated, detected, sensed, or otherwise measured, by the displacement sensor. The position signals generated by the displacement sensor indicate the position of the electrically controlled valve between a closed position and one or more different open positions. For example, the position signals based on the position of the solenoid of the displacement sensor indirectly indicate the position of the valve plate. In one embodiment, the displacement sensor may generate position voltages indicative of the position of the valve. In another embodiment, the displacement sensor may generate or sense another output that may indicate the position of the valve.

Optionally, the electrically controlled valve may include additional or alternative components that control the movement of the valve plate between the closed position and one or more open positions. For example, the valve may be devoid or without a gear and rack, and may have an alternative system that may control operation of the valve. For example, the electrically controlled valve may have alternative linear components that move the valve plate (e.g., rotate the plate, move in linear directions, or the like) responsive to linear movement.

Figure 4:
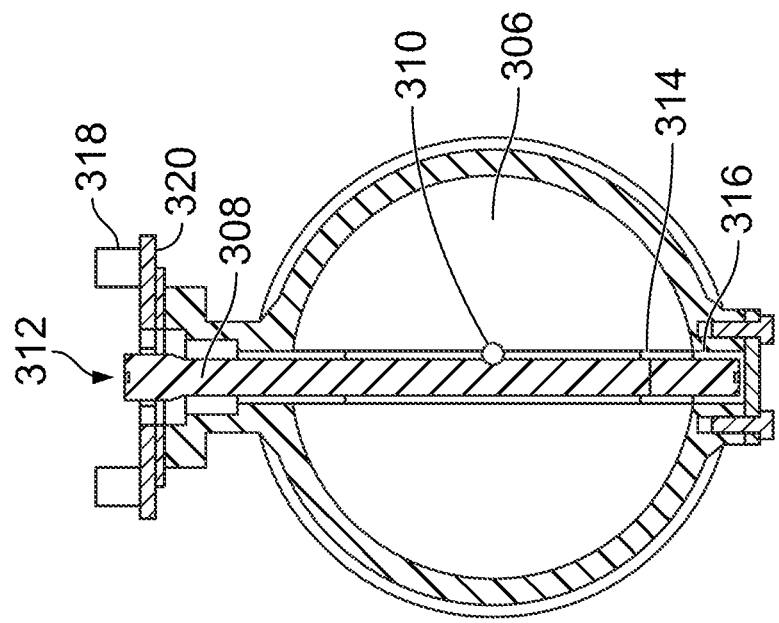
FIG. 4 illustrates a front view of the electrically controlled valve shown in FIG. 3
Figure 3:
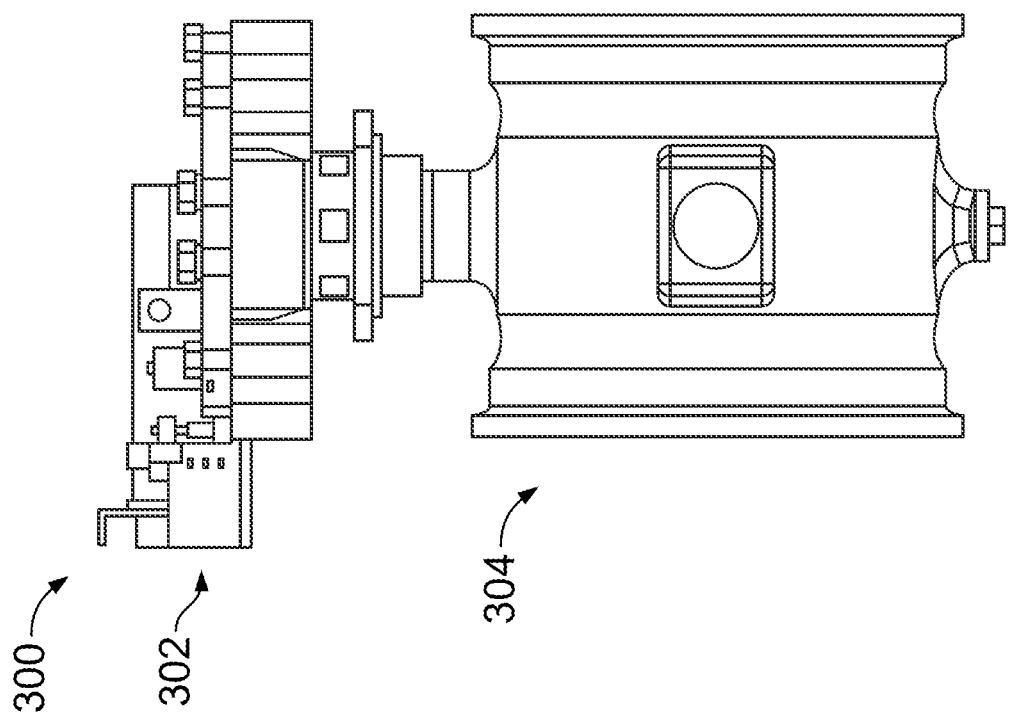
FIG. 3 illustrates a side view of an electrically controlled valve in accordance with one embodiment.

Optionally, the electrically controlled valve may have an alternative configuration. For example, FIG. 3 illustrates a side view of an electrically controlled valve 300 in accordance with one embodiment, and FIG. 4 illustrates a partial front view of the electrically controlled valve. Like the valve shown in FIG. 1, the electrically controlled valve includes an electrical portion 302 and a mechanical portion 304 operably coupled with the electrical portion. The mechanical portion includes a plate 306 that is configured to rotate about an axis (not shown) based on control of the plate by the electrical portion of the valve.

In the illustrated embodiment, the electrical portion includes an adapter plate 318 and gasket 320, and a shaft 312 that extends through the adapter plate from the electrical portion toward the mechanical portion. The mechanical portion includes the plate, a pin 310, a washer 314 that receives an end portion of the shaft, and a bushing 316 that is operably coupled with end of the shaft.

Figure 5:
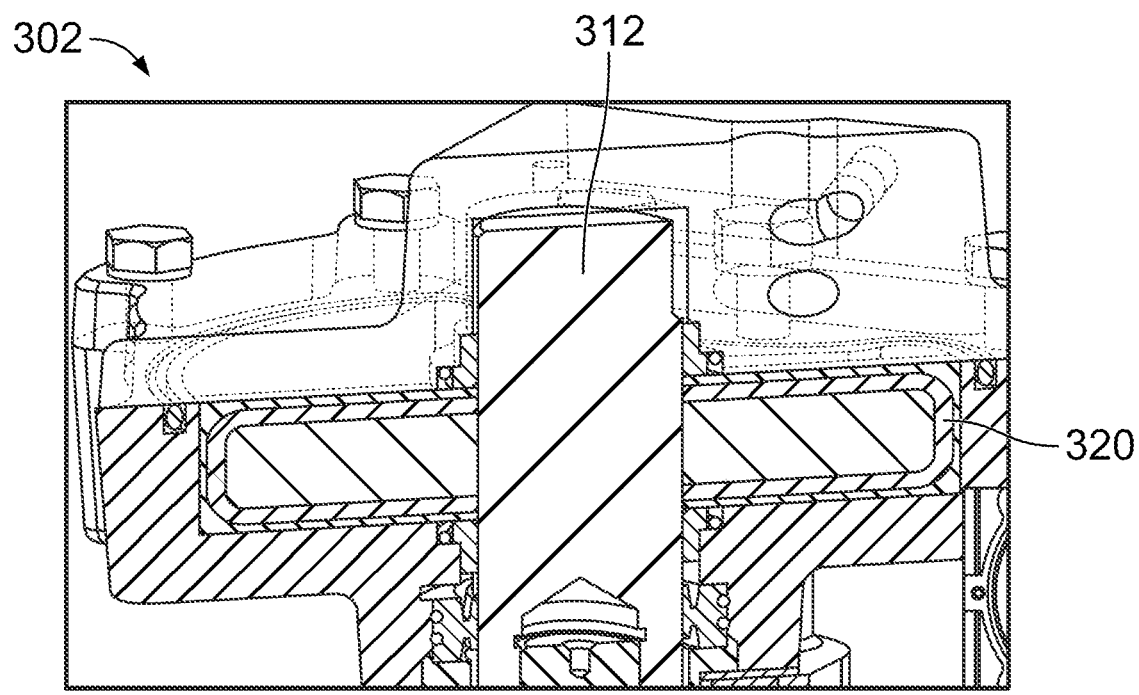
FIG. 5 illustrates a cross-sectional side view of a portion of the electrically controlled valve shown in FIG. 3.
Figure 6:
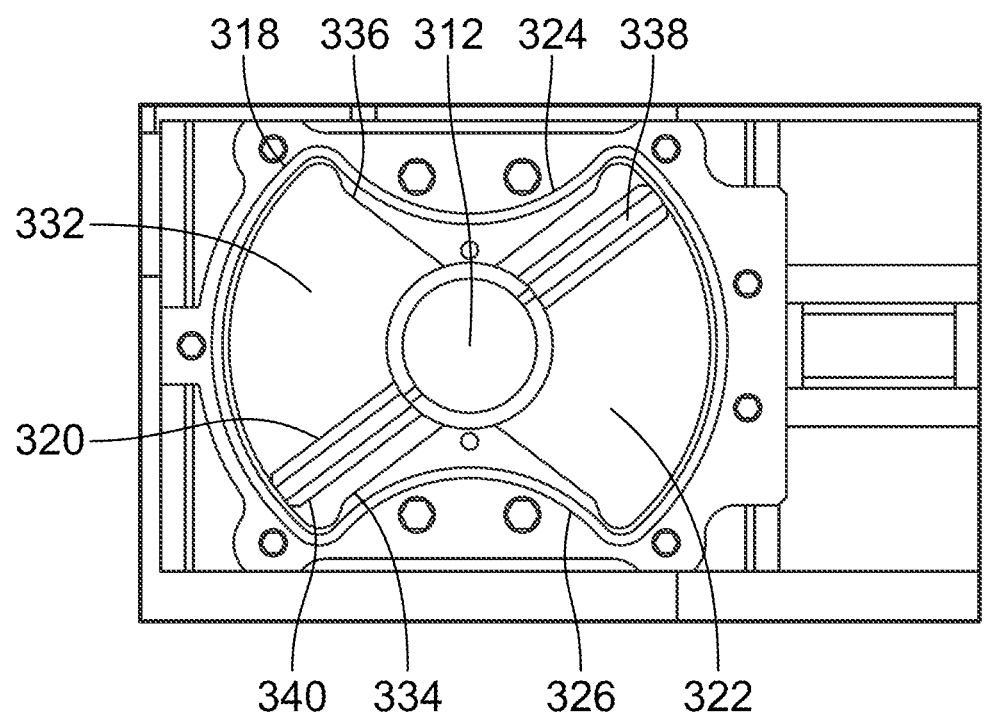
FIG. 6 illustrates a cross-sectional top view of a portion of the electrically controlled valve shown in FIG. 3.

FIG. 5 illustrates a partial cross-sectional side view and FIG. 6 illustrates a cross-sectional top view of the electrical portion of the electrically controlled valve shown in FIGS. 3 and 4. The shaft extends through a passage of the gasket and a passage of the adapter plate along an axis (e.g., along the same axis as the axis of rotation of the plate). The adapter plate includes a chamber that is separated into a first pocket 322 and a second pocket 332. The gasket is coupled with the adapter plate such a first portion 338 of the gasket is disposed within the first pocket and a second portion 340 of the gasket is disposed within the second pocket.

In one or more embodiments, a pump device (not shown) may pump a fluid (e.g., a gas, a liquid, a gas-liquid mixture) into and/or out of the first and second pockets of the adapter plate. The first and second portions of the gasket move within the first and second pockets, respectively, responsive to the fluid being directed into or out of the first and second pockets. For example, the first portion of the gasket may rotate to move toward a first surface 324 of the first pocket, and the second portion of the gasket may rotate with the first portion of the gasket to move toward a first surface 334 of the second pocket. Alternatively, the first portion of the gasket may rotate to move toward a second surface 326 of the first pocket, and the second portion of the gasket may rotate to move toward a second surface 336 of the second pocket. The electrically controlled valve may be coupled with a displacement sensor (not shown) that may generate position signals based on rotational movement of the gasket about the axis of the shaft.

Movement of the gasket about the axis of the shaft controls rotational movement of the plate of the mechanical portion of the electrically controlled valve. For example, the rotational movement of the gasket within the adapter plate may be controlled by the flow of a fluid directed into or out of the first and second pockets of the adapter plate. The gasket is coupled with the shaft, and the shaft is coupled with the plate. The position of the plate between one or more open positions and a closed position may be controlled based on the rotational position of the gasket. Optionally, the electrically controlled valve may have any alternative configuration or arrangement, and the plate of the electrically controlled valve may be controlled by any additional and/or alternative components of the electrical portion of the electrically controlled valve.

Figure 7:
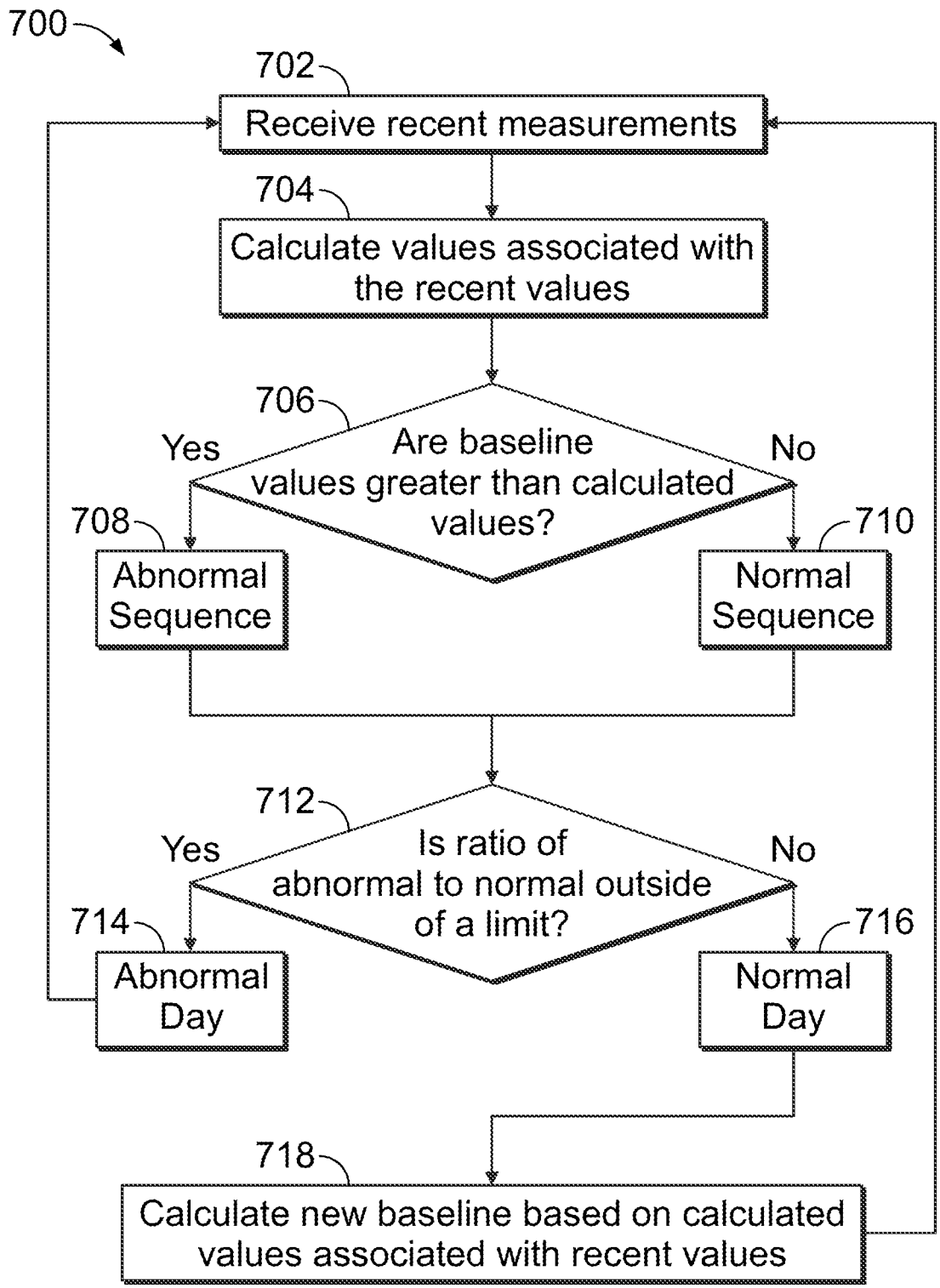
FIG. 7 illustrates a flowchart of one example of a method for determining a health state of an electrically controlled valve in accordance with one embodiment.

FIG. 7 illustrates a flowchart 700 of one embodiment of a method of determining a health state of an electrically controlled valve, such as the electrically controlled valve illustrated in FIGS. 1 through 6. One or more of the operations performed or associated with the method may be omitted, performed multiple times, performed in an alternative order, or the like.

At 702, one or more processors receive recent measurements (e.g., subsequently measured values) of the electrically controlled valve. For example, the electrically controlled valve may be operably coupled with a computer or alternative controller having and/or connected with one or more processors, such as one or more microprocessors, field programmable gate arrays, integrated circuits, and/or the like. The electrically controlled valve may be wirelessly coupled with the one or more processors, or conductively coupled via one or more conductors, wires, or the like.

Figure 8:
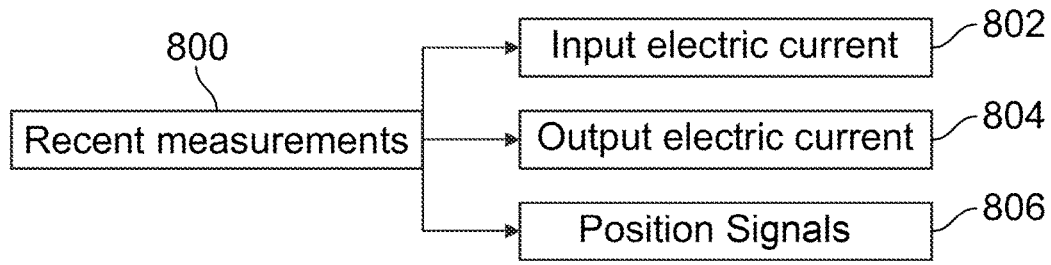
FIG. 8 illustrates one example of values associated with an electrically controlled valve in accordance with one embodiment.

FIG. 8 illustrates one example of the measurements 800 that may be received, sensed, or otherwise obtained by the one or more processors. The measurements may include an input electric current 802, an output electric current 804, and position signals 806. The processors may receive measurements and/or sensed data from the displacement sensor and one or more sensors operably coupled with the pump device. In one embodiment, the input electric current may be a current that is applied to the pump or pump device that pumps the fluid into the chamber of the electrically controlled valve to change the position of the valve. The output electric current may be a current that is output from the pump or pump device in response to the input electric current being input into the electrically controlled valve. The position signals may be generated by the displacement sensor that changes values of the position signals based on linear displacement of the solenoid within the displacement sensor of the electrically controlled valve.

In one or more embodiments, the processors may receive measurements or sample data at predetermined scheduled intervals (e.g., once a day, once an hour, once every minute, once every second, or the like). Optionally, the processors may receive measurements or sample data at non-scheduled intervals. For example, an operator of the electrically controlled valve and/or the controller (not shown) may manually control operation of the sensors associated with the electrically controlled valve to receive sensed data. The operator may request to receive sampled data or sensed measurements based on an operating condition of the valve (e.g., if the valve appears to be malfunctioning), based on a state of the valve (e.g., if the electrically controlled valve is being repaired, if the valve has been in operation or use for a predetermined length of time such as 1 day, 1 week, 1 month, 1 year, 5 years, or the like), or for any alternative reason. Optionally, the processors may receive measurements or sample data at non-scheduled intervals based on the processors automatically requesting sensed data from the sensors of the electrically controlled valve. For example, the processors may determine that the electrically controlled valve is potentially malfunctioning, and may request sensed data at a time in between a predetermined schedule interval.

Figure 9:
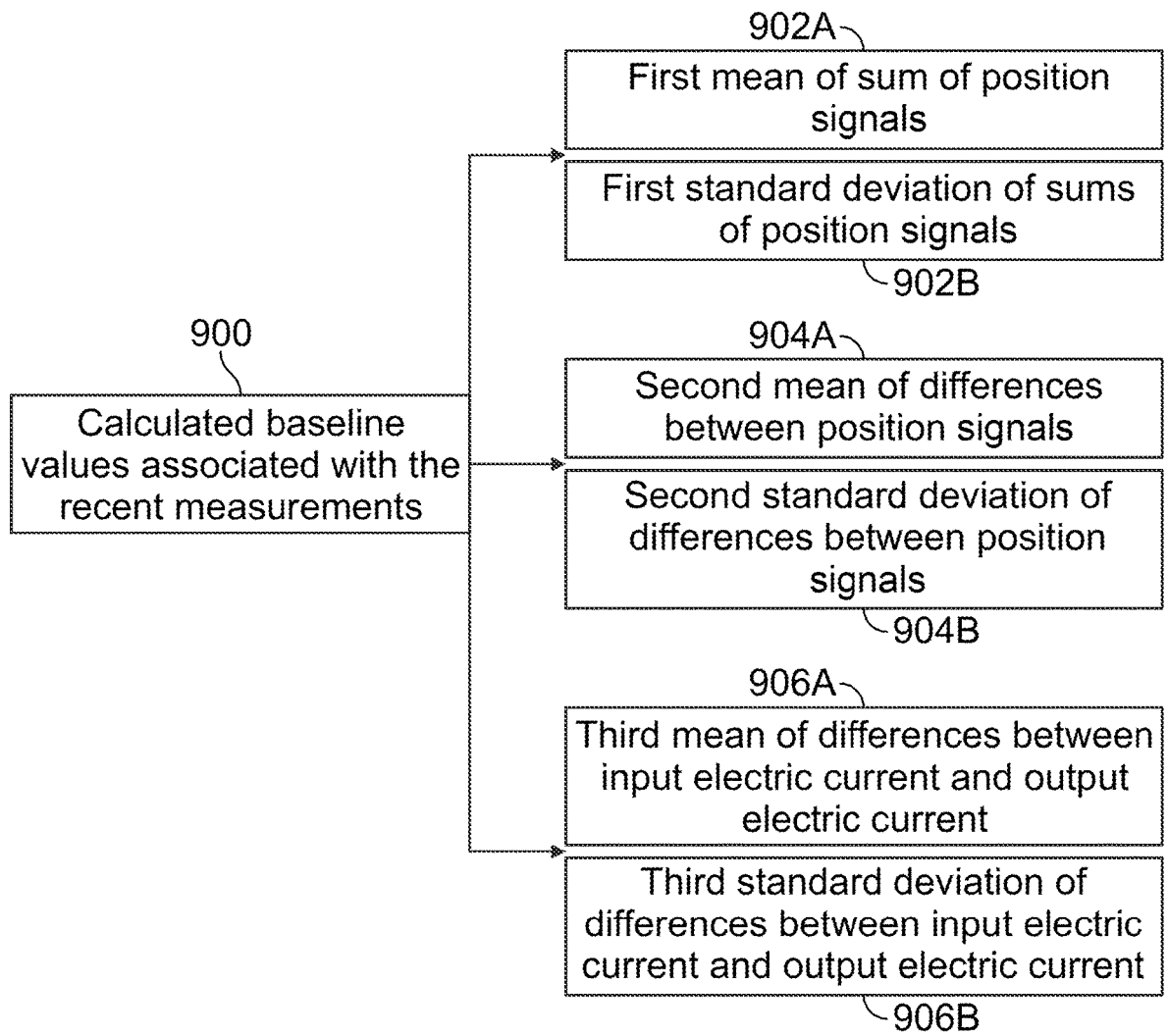
FIG. 9 illustrates one example of baseline values associated with an electrically controlled valve in accordance with one embodiment.

Returning to FIG. 7, at 704, the processors calculate values associated with the recent values determined and/or received at 702. For example, FIG. 9 illustrates one example of calculated baseline values 900 associated with the electrically controlled valve in accordance with one embodiment. The calculated baseline values may be associated with the input electric current, the output electric current, and the position signals (e.g., position voltages or the like). In one embodiment, the calculated baseline values may include a sum of the position signals, a different between position signals, a difference between the input electric current and the output electric current, or the like.

In one or more embodiments, the calculated baseline values may include a first mean of the sum of the position signals (e.g., position voltages or the like) 902A and a first standard deviation of the sums of the position signals 902B or position signals repeatedly sampled during a prior moving window; a second mean 904A and a second standard deviation 904B of differences between the position signals repeatedly sampled during the prior moving time window; and a third mean 906A and a third standard deviation 906B of differences between the input electric current and output electric current repeatedly sampled during the prior moving time window.

Recently calculated baseline values (or baseline values calculated with subsequently measured values) may be compared with calculated baseline values based on previous measurements of the input electric current, the output electric current, and the position signals. Differences between the recent calculated baseline values and the previous baseline values may indicate a health state of the electrically controlled valve. For example, previous measurements of the input electric current, the output electric current, and the position signals may be collected, stored, maintained, or the like, by the one or more processors. In one embodiment, the processors may store a predetermined amount of previous measurements.

Figures 10, 11:
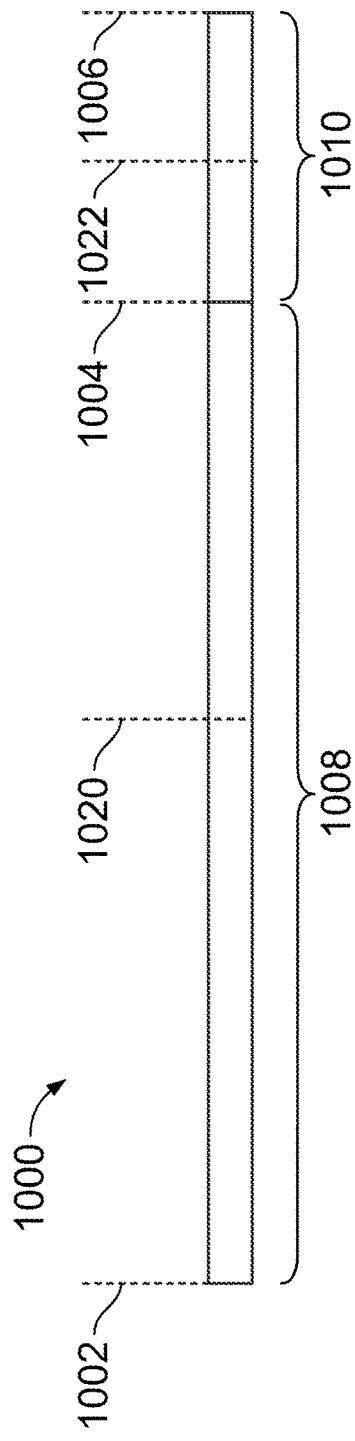
FIG. 10 illustrates a timeline including a moving time window in accordance with one embodiment.
FIG. 11 illustrates a table of one example of mapping comparison values to determine the health state of an electrically controlled valve in accordance with one embodiment.

For example, FIG. 10 illustrates a timeline 1000 including a moving time window 1008 in accordance with one embodiment. The timeline includes a start time 1002 that may represent a day, date, a time of day, or the like. The timeline includes the moving time window 1008 that extends between the start time and a first stop time 1004. The moving time window may also be referred to as a moving day average, or moving time average. In one or more embodiments, the moving time window may be a length of time that is about 50 days long between the start and first stop times, may be 100 days long, may be 200 days long, or the like. Optionally, the moving time window may be associated with an amount of repeatedly sampled data. For example, the moving time window may be based on the processors receiving 50 sets of sampled baseline data, 100 sets of sampled baseline data, 200 sets of sampled baseline data, or the like. The size and/or length of the moving time window may remain constant, with the start time and the first stop time moving to maintain the constant moving time window. For example, the moving time window may have a predetermined length of 180 days such that the processors may store the baseline values of data received during the 180 day moving time window. At day 181, the processors may remove or eliminate the data associated with day 1, and at day 182, the processors may remove or eliminate the data associated with day 2. Optionally, the moving time window may have alternative predetermined rules, requirements, or the like.

Returning to FIG. 7, at 706 a decision is made whether the baseline values are greater than the calculated values. New or recent data is evaluated on a daily or otherwise predetermined timeline basis, and is compared with baseline data of the electrically controlled valve. For example, the recent values associated with the input electric current, the output electric current, and the position signals may be compared with baseline values associated with the input electric current, the output electric current, and the position signals during previous measurements. For example, (i) the input electric current, the output electric current, and the position signals may be sensed or measured; (ii) baseline values may be calculated or determined based on the sensed or measured input electric current, output electric current, and the position signals; (iii) subsequent and/or additional sensing or measuring of the input electric current, the output electric current, and the position signals may be performed or conducted (e.g., at a later time); and (iv) the health state of the electrically controlled valve may be determined based on comparing the values associated with the subsequent sensing to the baseline values associated with the previous sensing.

In one or more embodiments, the recent values of the first, second, and third means and standard deviations may be compared with the first, second, and third means and standard deviations of the previous data. For example, the processors compare the six different variables to determine whether the variables indicate a healthy or an unhealthy electrically controlled valve. If the recent baseline values are greater than the calculated values, flow of the method proceeds toward 308 and the recent baseline values may be associated with an abnormal sequence that may indicate a poor state of health of the electrically controlled valve.

Alternatively, if the recent baseline values are less than the calculated values, flow of the method proceeds toward 710 and the recent baseline values may be associated with a normal sequence that may indicate a good state of health of the electrically controlled valve. Optionally, the recent and previous baseline values may be compared in alternative ways such that an abnormal sequence may be indicated by recent baseline values being less than the previous calculated baseline values. Optionally, the abnormal sequence may be indicated by alternative comparison methods between the recent baseline values and the previous calculated baseline values (e.g., averages, percentages, alternative mean and/or standard deviation comparisons, or the like).

In one or more embodiments, the processors may determine the day values that are under evaluation to ensure that recent changes to the data being evaluated do not skew the normal data. For example, the processors may determine whether the calculated baseline values including the six variables should be recalculated and/or re-evaluated. The processors may determine whether data associated a particular day of evaluation is a normal day or an abnormal day. If the day is determined to be normal, the processors may update the calculated baseline values to include a variation shift or a mean shift in the full set of data. Alternatively, if the day is determined to be abnormal, the processors may ignore the recent data and may not update the calculated baseline values.

For example, at 712, the processors determine if a ratio of abnormal sequences to normal sequences is outside of a predetermined limit. If the day values under evaluation are considered to be abnormal, the abnormal evaluations may represent a variation shift or a mean shift based on at least one of the six variables. If the number of abnormal points relative to the number of normal points exceeds a predetermined limit or it outside of a predetermined limit, then the day is determined to be an abnormal day, and flow of the method proceeds toward 714.

In one or more embodiments, an abnormal day may be outside of the moving time window. For example, the abnormal day may be determined to be at a point 1022 within a recent timeline 1010 shown in FIG. 10 that extends between the first stop time 1004 and a second stop time 1006. For example, the start time may represent day T-210, the first stop time may represent day T-30, and the second stop time may represent T-0. If the day is determined to be abnormal, the day may fall within the recent timeline and may be too recent. The recent data may skew the data associated with the moving time window, and therefore the recent data may be ignored. Flow of the method may return to 302, and the method may repeat for a predetermined length of time, for a predetermined number of data sets to be collected or the like.

Alternatively, if the number of abnormal points relative to the number of normal points is within the predetermined limit, then the day is determined to be a normal day, and flow of the method proceeds toward 716. For example, the day may be determined to be at a point 1020 that fall within the moving time window between the start time and the first stop time. If the recent baseline values compared to the calculated baseline values associated with the moving time window differ, are outside of a predetermined range indicating the abnormal sequence, and the day is determined to be a normal day (relative to an abnormal day), then flow of the method proceeds toward 718. At 718, a new baseline may be calculated based on values associated with the recent values. For example, the six variables may be recalculated or determined based on the recent abnormal sequence discovered on a normal day of evaluation.

Optionally, the processors may update, recalculate, or re-evaluate the baseline values using one or more different methods. In one embodiment, the processors may calculate a fourth mean and fourth standard deviation of the sums of the position signals repeatedly sampled during a subset of the prior moving time window; calculate a fifth mean and a fifth standard deviation of the first differences between the position signals repeatedly sampled during the subset of the prior moving time window; and calculate a sixth mean and a sixth standard deviation of second differences between the input electric current and the outlet electric current repeatedly sampled during the subset of the prior moving time window. The processors may compare the fourth mean and fourth standard deviation with the first mean and first standard deviation; compare the fifth mean and the fifth standard deviation with the second mean and the second standard deviation; and compare the sixth mean and the sixth standard deviation with the third mean and the third standard deviation. The processors may update the baseline values (e.g., the first mean and first standard deviation, the second mean and second standard deviation, and the third mean and third standard deviation) based on the comparison between the twelve data sets.

In one or more embodiments, the processors may determine a set of comparison values indicative of comparing the fourth mean and the fourth standard deviation with the first mean and the first standard deviation; the fifth mean and fifth standard deviation with the second mean and second standard deviation; and the sixth mean and sixth standard deviation with the third mean and third standard deviation. Optionally, the processors may map the set of the comparison values with different values of the health state of the electrically controlled valve to determine the health state of the valve. For example, FIG. 11 illustrates a table 1100 of one example of mapping the set of comparison values to determine the health state of the valve. The table include a first column 1102 that indicates a case or evaluation number. The table also includes second, third, fourth, fifth, sixth, and seventh columns 1104 through 1114 indicative of each of the six comparison values indicative of comparing the different mean and standard deviation values. For example, the columns 1104 through 1114 indicate if one of the set of the comparison values is outside of a predetermined limit, exceeds a predetermined limit, or the like.

The table includes an eighth column 1116 that is based on the data associated with columns 1104 through 1114. The processors may determine a state of health of the electrically controlled valve based on the data in column 1116. For example, the processors may determine whether the electrically controlled valve is healthy or unhealthy based on the data indicated in column 1116, and may communicate the determined state of health of the valve in a ninth column 1118. In one or more embodiments, the processors may determine that the state of health of the valve is inconclusive based on the data analysis, and may indicate to an operator of the valve that the valve requires further analysis. Optionally, the processors may determine a state of health of a particular component of the valve and that only the particular component requires repair or replacement. For example, the processors may determine that there is an issue with the solenoid of the displacement sensor of the valve, that there is an issue with another portion of the position sensor, that there is an oil leak within the valve, that the valve plate is stuck, that the electrically controlled valve is overheating, that there is a short circuit or a damaged wire within the valve, or the like.

The processors may determine the state of health of the electrically controlled valve based on the data analysis of the position sensor and the input and output electric current. In one or more embodiments, the processors may determine that the valve, or a portion of the valve, requires repairing or replacement based on the health state of the valve. Optionally, the processors may indicate to an operator of the valve that the valve requires repairing and/or replacement (e.g., via an output device, an audio and/or visual alarm, or the like). Optionally, the processors may determine that the additional evaluation is needed to determine the state of health of the valve. Optionally, the processors may determine that the failure is unknown, but that the electrically controlled valve is still able to operate. Optionally, the processors may determine that the valve needs to be replaced, and may determine a state of urgency of replacing the valve.

In one or more embodiments of the subject matter described herein, a method includes measuring input electric current that is input into an electrically controlled valve to change a position of the electrically controlled valve. Output electric current that is output from the electrically controlled valve in response to the input electric current being input into the electrically controlled valve is measured. Position signals are generated using a sensor coupled with the electrically controlled valve that are indicative of the position of the electrically controlled valve. Baseline values associated with the input electric current, the output electric current, and the position signals are calculated. A health state of the electrically controlled valve is determined by comparing the baseline values associated with the input electric current, the output electric current, and the position signals with subsequently measured values associated with the input electric current, the output electric current, and the position signals.

Optionally, the method may include repairing or replacing the electrically controlled valve based on the health state.

Optionally, the input electric current that is measured may be applied to a pump device that pumps a fluid into a chamber of the electrically controlled valve to change the position of the electrically controlled valve.

Optionally, the output electric current that is measured may be output from a pump device that pumps a fluid into a chamber of the electrically controlled valve to change the position of the electrically controlled valve.

Optionally, the position signals may be generated as the position voltages that are measured by a displacement sensor that changes values of the position voltages based on a linear displacement of a solenoid within the electrically controlled valve.

Optionally, the position signals may be or include position voltages, and the baseline values that are calculated may include a sum of the position voltages.

Optionally, the position signals may be or include position voltages, and the baseline values that are calculated may include a difference between the position voltages.

Optionally, the baseline values that are calculated may include a difference between the input electric current and the output electric current.

Optionally, the position signals may be or include position voltages, and the baseline values that are calculated may include a first mean and a first standard deviation of sums of the position voltages repeatedly sampled during a prior moving time window, a second mean and a second standard deviation of the first differences between the position voltages repeatedly sampled during the prior moving time window, and a third mean and a third standard deviation of second differences between the input electric current and the output electric current repeatedly sampled during the prior moving time window.

Optionally, determining the health state of the electrically controlled valve may include calculating a fourth mean and a fourth standard deviation of the sums of the position voltages repeatedly sampled during a subset of the prior moving time window, a fifth mean and a fifth standard deviation of the first differences between the position voltages repeatedly sampled during the subset of the prior moving time window, and a sixth mean and a sixth standard deviation of the second differences between the input electric current and the output electric current repeatedly sampled during the subset of the prior moving time window. The fourth mean and the fourth standard deviation are compared with the first mean and the first standard deviation, the fifth mean and the fifth standard deviation are compared with the second mean and the second standard deviation, and the sixth mean and the sixth standard deviation are compared with the third mean and the third standard deviation.

Optionally, determining the health state of the electrically controlled valve may include determining a set of comparison values indicative of comparing the fourth mean and the fourth standard deviation with the first mean and the first standard deviation, the fifth mean and the fifth standard deviation with the second mean and the second standard deviation, and the sixth mean and the sixth standard deviation with the third mean and the third standard deviation, and mapping the set of the comparison values with different values of the health state of the electrically controlled value to determine the health state of the electrically controlled valve.

In one or more embodiments of the subject matter described herein, a system includes an electrically controlled valve that receives input electric current to change a position of the electrically controlled valve, one or more sensors configured to measure the input electric current that is input into the electrically controlled valve and measure output electric current that is output from the electrically controlled valve in response to the input electric current being input into the electrically controlled valve. The sensors generate position signals indicative of the position of the electrically controlled valve. The system includes one or more processors that calculate baseline values associated with the input electric current, the output electric current, and the position signals. The processors determine a health state of the electrically controlled valve by comparing the baseline values associated with the input electric current, the output electric current, and the position signals with subsequently measured values associated with the input electric current, the output electric current, and the position signals.

Optionally, the input electric current that is measured is applied to a pump device that pumps a fluid into a chamber of the electrically controlled valve to change the position of the electrically controlled valve.

Optionally, the output electric current that is measured is output from a pump device that pumps a fluid into a chamber of the electrically controlled valve to change the position of the electrically controlled valve.

Optionally, the position signals that are generated are output by a displacement sensor that changes values of the position signals based on linear displacement of a solenoid within the electrically controlled valve.

Optionally, the position signals may be or include position voltages, and the baseline values that are calculated include a sum of the position voltages and a difference between the position voltages.

Optionally, the position signals may be or include position voltages, and the baseline values that are calculated into a difference between the input electric current and the output electric current.

Optionally, the position signals may be or include position voltages, and the baseline values that are calculated may include a first mean and a first standard deviation of sums of the position voltages repeatedly sampled during a prior moving time window, a second mean and a second standard deviation of the first differences between the position voltages repeatedly sampled during the prior moving time window, and a third mean and a third standard deviation of second differences between the input electric current and the output electric current repeatedly sampled during the prior moving time window.

Optionally, the one or more processors may calculate a fourth mean and a fourth standard deviation of the sums of the position voltages repeatedly sampled during a subset of the prior moving time window, a fifth mean and a fifth standard deviation of the first differences between the position voltages repeatedly sampled during the subset of the prior moving time window, and a sixth mean and a sixth standard deviation of the second differences between the input electric current and the output electric current repeatedly sampled during the subset of the prior moving time window, and may compare the fourth mean and the fourth standard deviation with the first mean and the first standard deviation, compare the fifth mean and the fifth standard deviation with the second mean and the second standard deviation, and compare the sixth mean and the sixth standard deviation with the third mean and the third standard deviation.

In one or more embodiments of the subject matter described herein, a method includes measuring input electric current that is input into an electrically controlled valve to change a position of the electrically controlled valve. The method includes measuring output electric current that is output from the electrically controlled valve in response to the input electric current being input into the electrically controlled valve. Position voltages are measured using a sensor coupled with the electrically controlled valve. The position voltages are indicative of the position of the electrically controlled valve. Baseline values associated with the input electric current, the output electric current, and the position voltages are calculated. The baseline values that are calculated include a first mean and a first standard deviation of sums of the position voltages repeatedly sampled during a prior moving time window, a second mean and a second standard deviation of first differences between the position voltages repeatedly sampled during the prior moving time window, and a third mean and a third standard deviation of second differences between the input electric current and the output electric current repeatedly sampled during the prior moving time window. A fourth mean and a fourth standard deviation of the sums of the position voltages repeatedly sampled during a subset of the prior moving time window are calculated, a fifth mean and a fifth standard deviation of the first differences between the position voltages repeatedly sampled during the subset of the prior moving time window are calculated, and a sixth mean and a sixth standard deviation of the second differences between the input electric current and the output electric current repeatedly sampled during the subset of the prior moving time window are calculated. The fourth mean and the fourth standard deviation are compared with the first mean and the first standard deviation, the fifth mean and the fifth standard deviation are compared with the second mean and the second standard deviation, and the sixth mean and the sixth standard deviation are compared with the third mean and the third standard deviation. A health state of the electrically controlled valve is determined by determining a set of comparison values indicative of comparing the fourth mean and the fourth standard deviation with the first mean and the first standard deviation, the fifth mean and the fifth standard deviation with the second mean and the second standard deviation, and the sixth mean and the sixth standard deviation with the third mean and the third standard deviation. The set of the comparison values are mapped with different values of the health state of the electrically controlled value to determine the health state of the electrically controlled valve.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and clauses, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and clauses, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The clauses define the patentable scope of the disclosure, and include other examples that occur to those of ordinary skill in the art. Such other examples are intended to be within the scope of the clauses if they have structural elements that do not differ from the literal language of the clauses, or if they include equivalent structural elements with insubstantial differences from the literal language of the clauses.

What is claimed is:

1. A method comprising:
applying an input electric current to a pump device to cause the pump device to direct a fluid into a chamber of an electrically controlled valve to change a position of the electrically controlled valve;
measuring the input electric current that is applied to the pump device to change the position of the electrically controlled valve;
measuring an output electric current that is output from the pump device in response to the input electric current being applied to the pump device and the position of the electrically controlled valve changing;
generating position signals using a sensor coupled with the electrically controlled valve, the position signals indicative of the position of the electrically controlled valve;
calculating baseline values associated with the input electric current, the output electric current, and the position signals, wherein the baseline values are based on measured input electric current values, measured output electric current values, and measured position signal values repeatedly sampled during a prior moving time window, and wherein the baseline values that are calculated include differences between the measured input electric current values and the measured output electric current values that are repeatedly sampled during the prior moving time window;
determining a health state of the electrically controlled valve by comparing the baseline values associated with the input electric current, the output electric current, and the position signals with subsequently measured values associated with the input electric current, the output electric current, and the position signals; and
repairing or replacing the electrically controlled valve based on the health state.

2. The method of claim 1, wherein the position signals are generated as position voltages that are measured by a displacement sensor that changes values of the position voltages based on linear displacement of a solenoid within the electrically controlled valve.

3. The method of claim 1, wherein the position signals comprise position voltages, and the baseline values that are calculated include a sum of the position voltages.

4. The method of claim 1, wherein the position signals comprise position voltages, and the baseline values that are calculated include a difference between the position voltages.

5. The method of claim 1, wherein the position signals comprise position voltages, and the baseline values that are calculated include a first mean and a first standard deviation of sums of the position voltages repeatedly sampled during the prior moving time window, a second mean and a second standard deviation of first differences between the position voltages repeatedly sampled during the prior moving time window, and a third mean and a third standard deviation of second differences between the measured input electric current values and the measured output electric current values repeatedly sampled during the prior moving time window.

6. The method of claim 5, wherein determining the health state of the electrically controlled valve includes:
calculating a fourth mean and a fourth standard deviation of the sums of the position voltages repeatedly sampled during a subset of the prior moving time window, a fifth mean and a fifth standard deviation of the first differences between the position voltages repeatedly sampled during the subset of the prior moving time window, and a sixth mean and a sixth standard deviation of the second differences between the measured input electric current values and the measured output electric current values repeatedly sampled during the subset of the prior moving time window; and
comparing the fourth mean and the fourth standard deviation with the first mean and the first standard deviation, the fifth mean and the fifth standard deviation with the second mean and the second standard deviation, and the sixth mean and the sixth standard deviation with the third mean and the third standard deviation.

7. The method of claim 6, wherein determining the health state of the electrically controlled valve includes:
determining a set of comparison values indicative of comparing the fourth mean and the fourth standard deviation with the first mean and the first standard deviation, the fifth mean and the fifth standard deviation with the second mean and the second standard deviation, and the sixth mean and the sixth standard deviation with the third mean and the third standard deviation; and
mapping the set of the comparison values with different values of the health state of the electrically controlled valve to determine the health state of the valve.

8. A system comprising:
an electrically controlled valve comprising a chamber configured to receive a fluid to change a position of the electrically controlled valve;
a pump device configured to pump the fluid into the chamber in response to an input electric current being applied to the pump device;
one or more sensors configured to measure the input electric current that is applied to the pump device to change the position of the valve and measure an output electric current that is output from the pump device in response to the input electric current being applied to the pump device and the position of the electrically controlled valve changing, wherein the one or more sensors are configured to generate position signals indicative of the position of the electrically controlled valve; and
one or more processors configured to:
calculate baseline values associated with the input electric current, the output electric current, and the position signals, the baseline values based on measured input electric current values, measured output electric current values, and measured position signal values repeatedly sampled during a prior moving time window, wherein baseline values that are calculated including differences between the measured input electric current values and the measured output electric current values that are repeatedly sampled during the prior moving time window;
determine a health state of the electrically controlled valve by comparing the baseline values associated with the input electric current, the output electric current, and the position signals with subsequently measured values associated with the input electric current, the output electric current, and the position signals; and
indicate to an operator that the electrically controlled valve requires repairing or replacing based on the health state.

9. The system of claim 8, wherein the position signals are generated as position voltages that are measured by a displacement sensor that changes values of the position voltages based on linear displacement of a solenoid within the electrically controlled valve.

10. The system of claim 8, wherein the position signals comprise position voltages, and the baseline values that are calculated include a sum of the position voltages and a difference between the position voltages.

11. The system of claim 8, wherein the position signals comprise position voltages, and the baseline values that are calculated include a first mean and a first standard deviation of sums of the position voltages repeatedly sampled during the prior moving time window, a second mean and a second standard deviation of first differences between the position voltages repeatedly sampled during the prior moving time window, and a third mean and a third standard deviation of second differences between the measured input electric current values and the measured output electric current values repeatedly sampled during the prior moving time window.

12. The system of claim 11, wherein the one or more processors are configured to calculate a fourth mean and a fourth standard deviation of the sums of the position voltages repeatedly sampled during a subset of the prior moving time window, a fifth mean and a fifth standard deviation of the first differences between the position voltages repeatedly sampled during the subset of the prior moving time window, and a sixth mean and a sixth standard deviation of the second differences between the measured input electric current vales and the measured output electric current values repeatedly sampled during the subset of the prior moving time window, and
- wherein the one or more processors are configured to compare the fourth mean and the fourth standard deviation with the first mean and the first standard deviation, compare the fifth mean and the fifth standard deviation with the second mean and the second standard deviation, and compare the sixth mean and the sixth standard deviation with the third mean and the third standard deviation to determine the health state of the electrically controlled valve.

13. A method comprising:
measuring input electric current that is input into an electrically controlled valve to change a position of the electrically controlled valve;
measuring output electric current that is output from the electrically controlled valve in response to the input electric current being input into the electrically controlled valve and the position of the electrically controlled valve changing;
generating position voltages using a sensor coupled with the electrically controlled valve, the position voltages indicative of the position of the electrically controlled valve;
calculating baseline values associated with the input electric current, the output electric current, and the position voltages based on previous measurements of the input electric current, the output electric current, and the position voltages, wherein the baseline values that are calculated include a first mean and a first standard deviation of sums of the position voltages repeatedly sampled during a prior moving time window, a second mean and a second standard deviation of first differences between the position voltages repeatedly sampled during the prior moving time window, and a third mean and a third standard deviation of second differences between the input electric current and the output electric current repeatedly sampled during the prior moving time window;
calculating a fourth mean and a fourth standard deviation of the sums of the position voltages repeatedly sampled during a subset of the prior moving time window, a fifth mean and a fifth standard deviation of the first differences between the position voltages repeatedly sampled during the subset of the prior moving time window, and a sixth mean and a sixth standard deviation of the second differences between the input electric current and the output electric current repeatedly sampled during the subset of the prior moving time window;
comparing the fourth mean and the fourth standard deviation with the first mean and the first standard deviation, the fifth mean and the fifth standard deviation with the second mean and the second standard deviation, and the sixth mean and the sixth standard deviation with the third mean and the third standard deviation;
determining a health state of the electrically controlled valve by determining a set of comparison values indicative of comparing the fourth mean and the fourth standard deviation with the first mean and the first standard deviation, the fifth mean and the fifth standard deviation with the second mean and the second standard deviation, and the sixth mean and the sixth standard deviation with the third mean and the third standard deviation;
mapping the set of the comparison values with different values of the health state of the electrically controlled valve to determine the health state of the valve; and
repairing or replacing the electrically controlled valve based on the health state that is determined.

* * * * *